United States Patent
Booij et al.

(10) Patent No.: US 11,353,569 B2
(45) Date of Patent: *Jun. 7, 2022

(54) LOCATION DETERMINATION USING ACOUSTIC MODELS

(71) Applicant: SONITOR TECHNOLOGIES AS, Oslo (NO)

(72) Inventors: Wilfred Edwin Booij, Oslo (NO); Cyril Antille, Oslo (NO)

(73) Assignee: SONITOR TECHNOLOGIES AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 17/088,173

(22) Filed: Nov. 3, 2020

(65) Prior Publication Data
US 2021/0141074 A1     May 13, 2021

Related U.S. Application Data
(63) Continuation of application No. 15/858,845, filed on Dec. 29, 2017, now Pat. No. 10,823,830.

(51) Int. Cl.
*G01S 11/14* (2006.01)
*G01S 5/18* (2006.01)
(Continued)

(52) U.S. Cl.
CPC .............. *G01S 11/14* (2013.01); *G01S 5/18* (2013.01); *G01S 5/30* (2013.01); *G01S 5/26* (2013.01); *H04W 64/003* (2013.01)

(58) Field of Classification Search
CPC .............. G01S 11/14; G01S 5/18; G01S 5/30; G01S 5/26; H04W 64/003
See application file for complete search history.

(56) References Cited

U.S. PATENT DOCUMENTS
7,307,914 B1    12/2007    Carter
10,823,830 B2 *  11/2020   Booij ................. G01S 11/14
(Continued)

FOREIGN PATENT DOCUMENTS
CN    111837050 A  * 10/2020 ............ G01S 11/14
EP    3732499 A2   * 11/2020 ............ G01S 5/18
(Continued)

OTHER PUBLICATIONS
Daobilige Su et al., "An acoustic sensor based novel method for 2D localization of a robot in a structured environment," 2015 IEEE 10th Conference on Industrial Electronics and Applications (ICIEA), pp. 2024-2029, Jun. 15, 2015.
(Continued)

*Primary Examiner* — Daniel Pihulic
(74) *Attorney, Agent, or Firm* — Sterne, Kessler, Goldstein & Fox P.L.L.C.

(57) ABSTRACT

Systems and methods of estimating a location of a mobile computing device are provided. For instance, acoustic signals can be received from one or more transmitting devices associated with a real-time locating system. A set of peaks can be selected from the received acoustic signals. A first set of transmitter locations can be assigned to the selected set of peaks. The first set of transmitter locations can be specified by an acoustic model specifying a plurality of transmitter locations within an acoustic environment in which the one or more transmitting devices are located. A first model path trace associated with the first set of transmitter locations can be compared to the received acoustic signals. A location of the mobile computing device can be estimated based at least in part on the comparison.

17 Claims, 7 Drawing Sheets

(51) Int. Cl.
*G01S 5/30* (2006.01)
*G01S 5/26* (2006.01)
*H04W 64/00* (2009.01)

(56) References Cited

U.S. PATENT DOCUMENTS

| | | |
|---|---|---|
| 2015/0326966 A1 | 11/2015 | Mehra et al. |
| 2019/0204429 A1 | 7/2019 | Booij et al. |
| 2019/0272348 A1 | 9/2019 | Booij et al. |
| 2021/0141074 A1* | 5/2021 | Booij ........................ G01S 5/18 |

FOREIGN PATENT DOCUMENTS

| | | |
|---|---|---|
| WO | WO 2019/130246 A2 | 7/2019 |
| WO | WO 2019/130246 A3 | 8/2019 |

OTHER PUBLICATIONS

International Search Report dated Jun. 27, 2019 for Appl. No. PCT/IB2018/060665, 6 pages.
Written Opinion dated Jun. 27, 2019 for Appl. No. PCT/IB2018/060665, 6 pages.

* cited by examiner

LOCATION DETERMINATION USING ACOUSTIC MODELS

CROSS-REFERENCE TO RELATED APPLICATIONS

This application is a continuation of U.S. patent application Ser. No. 15/858,845, filed on Dec. 29, 2017, which is incorporated by reference herein in its entirety.

FIELD

The present disclosure relates generally to real-time locating systems, and more particularly to determining a location of a mobile device based at least in part on an acoustic model associated with an environment in which the mobile device is located.

BACKGROUND

A common challenge in modern business is to locate important resources at any given time in a building or campus environment. Such resources include key personnel, critical pieces of equipment, vital records and the like. For example, the personnel, the critical pieces of equipment and the vital records are typically mobile, are often needed in a variety of locations during a typical working day, and are therefore constantly being relocated during the working day. Given that it is unproductive to divert other resources to locate these resources, it is desirable to develop an approach that can locate these important resources at any time in the environment of a building, campus environment and the like.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for determining a location of a mobile computing device associated with an acoustic real-time locating system. The method includes receiving, by one or more computing devices, acoustic signals from one or more transmitting devices associated with a real-time locating system. The method further includes selecting, by the one or more computing devices, a set of peaks from the received acoustic signals. The method further includes assigning, by the one or more computing devices, a first set of transmitter locations to the selected set of peaks. The first set of transmitter locations is specified by an acoustic model specifying a plurality of transmitter locations within an acoustic environment in which the one or more transmitting devices are located. The method further includes comparing, by the one or more computing devices, a first model path trace associated with the first set of transmitter locations to the received acoustic signals. The method further includes estimating, by the one or more computing devices, a location of the mobile computing device based at least in part on the comparison of first model path trace to the received acoustic signals.

Other aspects of the present disclosure are directed to systems, apparatus, tangible, non-transitory computer-readable media, user interfaces and devices for estimating a location of a mobile computing device.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures.

DETAILED DESCRIPTION

Figure 1:
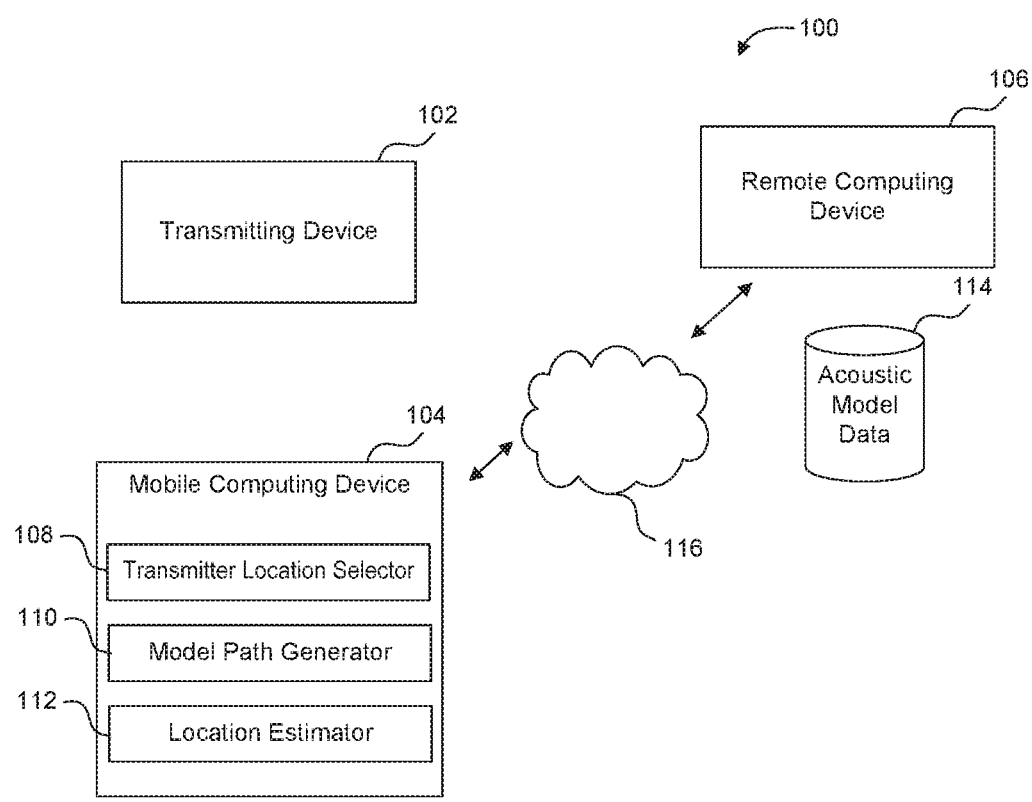
FIG. 1 depicts an example real-time locating system according to example aspects of the present disclosure.

Reference will now be made in detail to embodiments, one or more examples of which are illustrated in the drawings. Each example is provided by way of explanation of the embodiments, not limitation of the invention. In fact, it will be apparent to those skilled in the art that various modification and variations can be made to the embodiments without departing from the scope or spirit of the present disclosure. For instance, features illustrated or described as part of one embodiment can be used with another embodiment to yield a still further embodiment. Thus it is intended that aspects of the present disclosure cover such modifications and variations.

Real-time location systems have been developed using various wireless protocols, with perhaps the best known system being the global positioning system (GPS). While such location systems provide horizontal location accuracies of the order of approximately 8 meters, such systems do not address all location scenario requirements. For example, many scenarios demand location accuracies of better than 0.3 meters. Other scenarios require vertical accuracies that distinguish between floors in a high rise building. Still other scenarios require contextual location information, such as room-based information in an office building.

In response to these demanding location requirements, embodiments of the present disclosure provide solutions to these requirements. Acoustic signals may be used to determine the location of mobile units, or tags, in three dimensions by transmitting signals from a plurality of transmitting devices (which may be fixed to the walls or ceilings of a building). The acoustic signals may include encoded identifiers of the respective transmitting devices. These acoustic signals can be received by mobile computing devices. If the locations of the static transmitting devices are known, various characteristics of a set of acoustic signals received by the mobile computing devices can be used to estimate the location of each mobile device in the environment, using various suitable geometric calculations.

For instance, example aspects of the present disclosure are directed to determining a location of a mobile computing device associated with an acoustic real-time locating system. For instance, the mobile computing device can receive acoustic signals from one or more transmitting devices associated with the real-time locating system. The mobile computing device may select a set of signal peaks (e.g. two signal peaks) from the received acoustic signals, and may assign a first set of transmitter locations with each peak of the selected set of peaks. The transmitter locations can be defined in an acoustic model of an environment in which the one or more transmitting devices are located. Each transmitter location specified in the acoustic model can signify a location of a physical or "virtual" transmitting device located within the environment. The mobile computing device may compare a first model path trace associated with the first set of transmitter locations to the received acoustic signals. The mobile computing device may then estimate a location of the mobile computing device based at least in part on the comparison of the first model path trace to the received acoustic signals.

More particularly, the real-time locating system can include one or more acoustic transmitting devices deployed throughout an environment, such as a campus, building, room, space, area, etc. For instance, the transmitting devices can be deployed throughout a hospital, warehouse, etc. to facilitate a location determination of equipment, objects, inventory, people, etc. located within the hospital, warehouse, etc. The transmitting devices may be configured to, at various intervals (e.g. periodically), transmit acoustic (e.g. ultrasonic) positioning signals within the environment. For instance, the acoustic signals may be signals having a frequency from about 20 kHz to about 40 kHz. As used herein, the term "about," when used in reference to a numerical value is intended to refer to within 30% of the numerical value. As indicated, the acoustic signals can be received by one or more mobile computing devices located within a broadcast range of the transmitting devices, and can be used to facilitate an estimation of a location of the respective mobile computing device(s) within the environment.

Upon receiving acoustic signals from a transmitting device, the mobile computing device may estimate a location of the mobile computing device based at least in part on an acoustic model of an environment in which the mobile computing device and the transmitting device are located. More particularly, the acoustic model may correspond to a particular room, area, space, etc. in which the mobile computing device and/or the transmitting device is located. The acoustic model may specify a plurality of transmitter locations within the environment. The transmitter locations can correspond to one or more physical transmitting devices and one or more "virtual" transmitting devices. In particular, the acoustic model may model one or more reflection points within the environment as "virtual" transmitting devices that can be interpreted as physical transmitting devices for purposes of location estimation according to example aspects of the present disclosure. The modeled transmitter locations are dependent on the location of the physical transmitting device and the dimensional specifications of the reflective surfaces of the environment in which the transmitting devices are located. Such reflective surfaces can include walls, floors, ceilings, objects, items, furniture, etc. located within the environment that can reflect the acoustic signals transmitted by a physical transmitting device. The transmitter location(s) representing virtual transmitters may correspond to points of reflection within the environment at which the acoustic signal is reflected by a reflective surface. The transmitter location(s) representing physical transmitting device(s) may correspond to the actual location(s) of the physical transmitting device(s) within the environment.

In this manner, the acoustic model may represent the reflective surfaces within the environment as sonic mirrors. In some implementations, an attenuation of the reflective surfaces can be accounted for based at least in part on the materials of the reflective surfaces. The attenuation factor of such reflective surfaces can generally be in the order of between about 1 dB to about 10 dB, depending at least in part on the acoustic properties of the material of the reflective surface. The acoustic model can represent any reflective surface within the environment. For instance, as indicated, large reflective surfaces such as walls, ceilings, floors, etc. can be represented. Similarly, smaller, more minor reflective surfaces such as furniture, picture frames, light fixtures, ceiling fans, etc. can also be represented.

The transmitter locations specified by the acoustic model may be dependent on the dimensional specifications of the modeled reflective surfaces within the environment. The dimensional specifications may include data indicative of the location, size, orientation (e.g. direction normal), attenuation, and/or other suitable characteristic of the reflective surfaces. In this manner, the acoustic model may accurately represent reflection points (e.g. transmitter locations) on the reflective surfaces.

The acoustic model can include any suitable number of transmitter locations (e.g. representing physical transmitting device(s) and virtual transmitting device(s). In addition, the acoustic model can represent transmitter locations associated with $1^{st}$ order reflections, $2^{nd}$ order reflections, $3^{rd}$ order reflections, etc. As used herein, the order of reflections (e.g. $1^{st}$ order, $2^{nd}$ order, etc.) corresponds to the number of times that the acoustic signal associated with a particular transmitter location is reflected by a reflective surface. In this manner, a $1^{st}$ order transmitter location may represent a virtual transmitting device associated with an acoustic signal, such that the signal will have been reflected by one reflective surface prior to reaching the mobile computing device. The transmitter location may represent the reflection point on a reflective surface at which the signal was reflected. As another example, a $2^{nd}$ order transmitter location may represent a virtual transmitting device associated with an acoustic signal, such that the signal will have been reflected by two reflective surfaces prior to reaching the mobile computing device. The transmitter location may represent the reflection point on the second (e.g. the last) reflective surface at which the signal was reflected prior to reaching the mobile computing device. Similarly, a $0^{th}$ order transmitter location may represent a physical transmitting device, such that an acoustic signal received by a mobile computing device associated with the $0^{th}$ order transmitter location will have been reflected by zero reflective surfaces (e.g. will have propagated directly from the physical transmitting device to the mobile computing device).

It can be advantageous to limit the overlap of reflected signals used to define the acoustic model. For instance, signals transmitted by the transmitting device can be reflected by one or more reflective surfaces in the environment in which the transmitting device is located. Such reflected signals may overlap such that they are not distinguishable, which can prevent the transmitter locations associated with such reflected signals from being individually distinguishable. Such reflections may cause signal interference, which can potentially render the signals involved, or a subset thereof, indistinguishable from one another. Such interference effects are strongest when the differential difference between paths are less than for example a chip length, in the case of phase shift keyed signals. For instance, the higher order reflections may be more likely to overlap and cause signal interference. Accordingly, it can be beneficial to limit the likelihood of signal interference, such that each transmitter location specified in the acoustic model is individually distinguishable. In this manner, it can be advantageous to manipulate the number and positions of the transmitter locations to reduce such signal interference. The number of transmitter locations specified by the acoustic model can be dependent on the physical transmitting device(s) in the environment associated with the acoustic model. Similarly, the positions of the transmitter locations can also be dependent on the physical transmitting device(s). For instance, the location and orientation of the transmitting device can affect the number of and position of the transmitter locations. Similarly, the directivity of the transducer of the transmitting device can affect the number and position of transmitter locations. In this manner, a user can position and orient the transmitting device to reduce the number of transmitter locations specified by the acoustic model, as well as to manipulate the positions of the transmitter locations. Similarly, the user can choose particular transducer properties (e.g. directivity) to reduce the number of transmitter locations. As an example, positioning a physical transmitting device on or near a corner of a ceiling in a four-walled room can result in a greater number of distinguishable transmitter locations specified by the acoustic model, which can result in a more reliable acoustic environment. The uniqueness of such a placement of a transmitter device may also be determined at least in part by the accuracy at which the orientation of the receiving mobile computing device can be estimated.

The acoustic model may be generated prior to and without regard of the presence of a mobile computing device within the modeled environment. In this manner, the transmitter locations specified by the acoustic model are determined independently of the location of the mobile computing device. As will be described in greater detail below, upon entry of a mobile computing device into the environment and receipt of the acoustic signals, the mobile computing device can estimate the location of the mobile computing device based at least in part on the known transmitter locations as specified by the acoustic model.

More particularly, upon entry into an environment having a transmitting device(s), the mobile computing device can receive acoustic signals from the transmitting device(s). Such received signals may correspond to a signal propagating directly from the transmitting device(s) to the mobile computing device, as well as to one or more signals that have been reflected by a reflective surface within the environment. In this regard, the received acoustic signals can represent the measured acoustic response of the environment (e.g. room) with respect to the acoustic signals transmitted by transmitting device(s) and received by the mobile computing device; the received acoustic signal representing the convolution of the room response function with the transmitted acoustic signals. The location of the mobile computing device may be estimated based at least in part on the received acoustic signals and an acoustic model representing the environment.

For instance, a first set of peaks (e.g. a set of two peaks) may be selected from the received acoustic signals. More particularly, such peaks can be selected from a time domain representation of the magnitude of the received signals. The peaks can be selected based at least in part on an amplitude of the peaks and an order of occurrence of the peaks. For instance, the selected peaks may include the first two received peaks having an amplitude greater than a threshold. In this manner, the peaks may be selected based on an assumption that the selected peaks were caused by low order transmitter locations (e.g. the $0^{th}$ order transmitter location and a $1^{st}$ order transmitter location). Each peak of the set of selected peaks can be assigned to a transmitter location based at least in part on the acoustic model. The assignment may be determined based at least in part on an orientation of the mobile computing device with respect to the transmitter locations, and an angular sensitivity of one or more acoustic transducers (e.g. microphones) of the mobile computing device, and/or an angular sensitivity of a transducer of the acoustic transmitting device. The orientation of the mobile computing device may be determined, for instance, using one or more onboard sensors of the mobile computing device. The orientation may be determined with respect to the transmitter locations based at least in part on the known locations of the transmitter locations defined by the acoustic model. Most conventional microphones used in mobile computing devices have an omni-directional sensitivity to incoming acoustic waves in the frequency band of human speech, by choice of design. However as the frequency of the acoustic signal increases such microphones become increasingly directional, ultimately resulting in an angular sensitivity behavior at ultrasonic frequencies that may be characterized as a half sphere. This characteristic in combination with the orientation of the mobile computing device may be advantageously used in the positioning algorithms.

The selected peaks may be selected to correspond to signals associated with a $0^{th}$ order transmitter location and/or one or more $1^{st}$ order transmitter locations based at least in part on the assumption that the order of arrival of the peaks may correspond to the reflection orders associated with the transmitter locations due to the fact that the acoustic signals associated with higher reflection orders generally travel greater distances that acoustic signals associated with lower reflection orders. In this manner, the peaks may be selected based at least in part on the assumption that a signal (e.g. peak) from a $0^{th}$ order transmitter location will arrive prior to a signal from a $1^{st}$ order transmitter location, which will arrive prior to a signal from a $2^{nd}$ order transmitter location. Similarly, the assignment of the transmitter locations to the peaks may reflect the order of arrival of the peaks. For instance, the first peak may be assigned to the $0^{th}$ order transmitter location, and the second peak may be assigned to a $1^{st}$ order transmitter location. As another example, the first peak can be assigned to a first $1^{st}$ order transmitter location, and the second peak can be assigned to a second $1^{st}$ order transmitter location. As indicated, in some implementations, the peak assignments can be determined based at least in part on the orientation of the mobile computing device with respect to the transmitter locations, and an angular sensitivity of one or more acoustic transducers (e.g. microphones) of the mobile computing device. In such implementations, the reflection orders associated with the transmitter locations can aid in the transmitter location assignments.

A model path trace may be generated for the assigned transmitter locations and one or more candidate locations of the mobile computing device. In some implementations, one or more model path traces can be dynamically generated for one or more respective candidate locations of the mobile computing device. The model path trace for a candidate location can be an estimate of the acoustic response of an environment (e.g. room—for a room, the model path trace may be thought of as a room response function) with respect to acoustic signals transmitted by one or more transmitting devices and received by the mobile computing device at the candidate location. The model path trace can be estimated from the received acoustic signals by deconvolution with the transmitted acoustic signal. In this manner, a model path trace may be an equivalent of the magnitude of the signal received by the mobile computing device at the candidate location of the mobile computing device due to an infinitesimal burst of input energy (Dirac function). More particularly, as will be described and depicted with respect to FIG. 3 below, the model path trace may be an estimate of the magnitude of acoustic signals as a function of time as would be received by the mobile computing device if the mobile computing device were located at the candidate location and if the acoustic signals were the result of an infinitesimal burst of input energy (Dirac function). The model path trace may be determined based at least in part on the distance traveled of the received acoustic signals and the orientation of the mobile computing device with respect to the transmitter locations. The distance traveled may be determined based at least in part on the time of arrival of the acoustic signals and/or the time delay between the arrival of the selected peaks. In this manner, the amplitude of the model path trace may be determined based at least in part on the distance traveled, the orientation of the mobile computing device relative to the transmitting device, and the known angular sensitivity of the transducer(s) of the mobile computing device and the transducer(s) of the transmitting device(s), along with the attenuation coefficients associated with the environment (e.g. attenuation coefficients of the air, reflective surfaces, etc.). In some implementations, the distance traveled by the acoustic signals and/or the angular position of the received acoustic signals may be determined based at least in part on the amplitude of the received signals. More particularly, the distance traveled and/or angular position may be determined based at least in part on the amplitude and the orientation of the mobile computing device relative to the transmitting device, and the known angular sensitivity of the transducer(s) of the mobile computing device and the transducer(s) of the transmitting device(s), along with the attenuation coefficients associated with the environment. The technique of comparing measured received acoustic signals and modeled path traces can be used for system solutions where the mobile computing device has an estimate of the time of transmit of the acoustic signal in its own clock or where it has no such knowledge. In the latter case, an additional degree of freedom is added to the solution space; the unknown time offset between the time of transmit and the clock of the mobile receiving computing device. Once an estimate of the location of the mobile computing device is obtained in accordance with techniques described in the present disclosure, this offset can be estimated from the known distance between transmitter and mobile computing device and used in subsequent comparisons of measured and modeled path traces.

The model path trace approach has various benefits over other approaches. The model path trace is the response function of the environment resulting from an input Dirac function signal, i.e., the impulse response of the environment. Thus, while other approaches use signatures that are inseparable from the source signal used to generate them, the model path trace approach described herein results in a model path trace (i.e., environment response function) that is separate from the type of source signal and coding used to generate the resulting signal. Thus, rather than reflecting in part the source signal used, the model path trace is attributable only to the environment, rather than a function that also incorporates the properties of the source signal used. Put another way, the model path trace is decoupled from the source signal and the transducer used to generate the source signal, and is a manifestation of only the acoustic environment itself. The model path trace offers another benefit over other approaches in that it relies on both the amplitude as well as the timing information associated with the environment response function. Other approaches rely on a signature that highlights the timing of various peaks in the signature, where the peaks are linked to various multipath signals. By relying on both the amplitude as well as specific time information, the model path trace approach is richer in information and improves the quality of the resulting location determination. In addition to the benefits of the model path trace approach, some embodiments also incorporate the directionality of the microphone used to receive the acoustics signals to further enhance the location determination. While microphones are often omnidirectional, these same microphones become directional at higher acoustic frequencies (e.g., ultrasonic frequencies). Thus, given that an acoustic environment hosts a number of multipath signals that are received, incorporation of the directionality of the microphone can further improve the resulting location determination system. For example, the microphone of an iPhone (and other similar devices) are omnidirectional at lower audio frequencies, but are directional at ultrasonic frequencies. By incorporating a predetermined directional response of such a microphone, the location determination system is further enhanced.

The model path trace can be compared to the received acoustic signals to determine a degree of similarity between the model path trace and the received acoustic signals. More particularly, in some implementations, the comparison may include performing a least squares error sum to determine the least squares difference (e.g. weighted or unweighted) between the received acoustic signals and the model path trace. In some implementations, the comparison can include determining the correlation between the received acoustic signals and the model path trace.

If the comparison between the received acoustic signals and a model path trace results in a sufficient match (e.g. sufficiently low least squares error, sufficiently high correlation, etc.), the location of the mobile computing device may be estimated to be the candidate location for which the model path trace was generated. In some implementations, multiple combinations of transmitter location assignments may be determined for one or more peak sets, and model path traces may be generated for each transmitter location combination. More particularly, peaks may be iteratively selected and transmitter locations may be assigned to the selected peaks on an iterative basis. Model path traces may be generated for each transmitter location combination, and the model path traces may each be compared against the received acoustic signals in accordance with example aspects of the present disclosure. The location of the mobile computing device may be determined based at least in part on the comparisons. For instance, in some implementations, the location may be estimated to be the candidate location associated with model path trace that most closely matches the received acoustic signals. In alternative implementations, the location may be estimated to be the candidate location associated with the first determined model path trace that matches the received acoustic signals to a sufficient degree (e.g. greater than some threshold).

In some implementations, model path traces can be generated for a plurality of candidate locations of the mobile computing device within the environment in which the transmitting device is located. For instance, in some implementations, model path traces can be generated for each candidate location within the environment. In this manner, the candidate locations may correspond to areas or regions with some resolution within the environment. For instance, the environment may be partitioned into a plurality of candidate locations based at least in part on the acoustic model associated with the environment. In such implementations, the location of the mobile computing device may be estimated to be the candidate location for which the model path trace associated with the candidate location most closely matches the received acoustic signals.

In some implementations, the location of the mobile computing device (e.g. the x, y, z coordinates of the mobile computing device) can be estimated by solving a global optimization problem with respect to a plurality of candidate locations. For instance, in such implementations, the search space in which the plurality of candidate locations can be found can correspond to the entire environment. In this manner, model path traces may be determined for at least a subset of the candidate locations within the environment and a global minimum may be determined corresponding to the candidate location having the model path trace that most closely matches the received acoustic signals. In such implementation, the optimization may be solved using any suitable optimization solving technique. In this manner, as indicated above, the match between the model path traces and the received acoustic signals may be determined by performing a least squares error sum, weighted least squares error sum, correlation, etc. between the respective model path traces and the received acoustic signals. In some implementations, the location of the mobile computing device may be estimated by solving one or more local optimization problems at one or more candidate locations within the environment. For instance, the one or more candidate locations may be selected randomly (or pseudo-randomly), and local optimization problems may be solved to determine a local minimum with respect to each selected candidate location. In this manner, model path traces may be determined for each candidate location and/or for one or more locations proximate the candidate location(s) to determine the local minimum with respect to the model path trace(s) and the received acoustic signals for the candidate location. Such local optimizations may be solved for each selected candidate location until a sufficient match is found between a model path trace and the received acoustic signals. In some implementations, the local optimizations may be solved for each candidate location in the environment such that a global minimum is determined.

In some implementations, the search space in which candidate locations may be found may be reduced to a two-dimensional search space. For instance, the search space in which the candidate locations may be found may be restricted to a surface of a hyperboloid generated based at least in part on the time difference of arrival of the selected peaks and the assigned transmitter locations. As will be described in more detail below, the hyperboloid may be generated by rotating a hyperbola about its axis. In this manner, model path traces may be generated for one or more candidate locations on the surface of the hyperboloid. The model path traces may be compared with the received acoustic signals in accordance with example aspects of the present disclosure to determine an estimate of the location of the mobile computing device. More particularly, the estimation of the locations of the mobile computing device may include performing a least squares error sum to determine the location on the hyperboloid surface yielding the minimum least squares difference (e.g. weighted or unweighted) between the received acoustic signals and the model path trace generated for the location on the hyperboloid. In some implementations, the comparison may include determining the location on the hyperboloid surface yielding the highest correlation between the received acoustic signals and the model path trace generated for the surface location. In some other implementations, the comparison may include performing an optimization (e.g. global optimization and/or local optimization) with respect to the generated hyperboloid.

The location determination of a mobile computing device according to example aspects of the present disclosure may be used in various applications to monitor the variable locations of equipment, personnel, etc. In this regard, the location of the mobile computing device may be updated with time in order to monitor such locations as they change over time. In such implementations, the location of the mobile computing device may be updated by leveraging the initial location estimation in the subsequent updates. For instance, such updated location estimation techniques may include restricting the search space for estimating a new, updated location based at least in part on the previously estimated location, and/or to aid in the assignment of transmitter locations to selected peaks. In some implementations, the time of transmit of the acoustic signals may be estimated in an internal clock of the mobile computing device, such that the subsequent locations may be estimated using time of flight, as opposed to time difference of arrival. Further, in some implementations, the positioning sensors onboard the mobile computing device may be used to augment the subsequent location determinations, for instance by monitoring inertial movements of the mobile computing device subsequent to the estimation of the initial location.

The estimation of the location of the mobile computing device according to example aspects of the present disclosure may provide more accurate and efficient locating techniques relative to conventional real-time locating systems. In particular, the knowledge of the acoustic environment (e.g. the transmitter locations relative to the reflective surfaces) as provided by the acoustic model allows for the determination of model path traces, which may be compared to the received acoustic signals to facilitate the location estimation. Such techniques may provide location estimations with an accuracy of between about 3 centimeters to about 15 centimeters relative to the actual position of the mobile computing device. In addition, such location estimation techniques may reduce the number of transmitters required to estimate the location. Real-time locating systems using conventional trilateration or multilateration techniques may require three or more separate transducers to estimate a location of a mobile computing device. However, location estimation techniques of the present disclosure require only one transducer to estimate the location of a mobile computing device by leveraging the reflective properties of the surfaces within the environment. In particular, knowledge of the dimensional specifications and transmitter locations (e.g. representing a physical transmitting device and a plurality of virtual transmitter locations) as represented in the acoustic model may be leveraged to generate model path traces based on acoustic signals transmitted by a single transducer and reflected by one or more reflective surfaces. As described above, such model path traces may be compared to the received acoustic signals to facilitate the location estimation.

With reference now to the figures, example aspects of the present disclosure will be discussed in greater detail. For instance, FIG. 1 depicts an example real-time locating system 100 according to example aspects of the present disclosure. The system 100 includes a mobile computing device 102, a transmitting device 104, and a remote computing device 106. In various implementations, the system 100 may include one or more transmitting devices deployed throughout an environment (e.g. campus, building, room, area, etc.) in such a manner as to facilitate a location determination of one or more mobile computing devices located within the environment. The transmitting devices may be deployed in various suitable arrangements or configurations throughout the environment based on the needs or desires of the user.

The mobile computing device 102 may be configured to receive acoustic signals from the transmitting device 104 when located within a broadcast range of the transmitting device 104. In this manner, the transmitting device 104 may be configured to, at various intervals, (e.g. periodically), transmit acoustic (e.g. ultrasonic) signals that may be received by one or more mobile computing devices (e.g. mobile computing device 102), and used for determining the location of these mobile computing devices.

The mobile computing device 102 includes a transmitter location selector 108, a model path generator 110, and a location estimator 112. The transmitter location selector 108 may be configured to select one or more sets of peaks from a time domain representation of the magnitude of the received acoustic signals. More particularly, the transmitter location selector 108 may be configured to select a set of peaks based at least in part on the amplitude of the peaks and/or an order of arrival of the peaks. For instance, the transmitter location selector 108 may select a set of two peaks, wherein the selected peaks include the first two peaks received by the mobile computing device 102 that have an amplitude above a threshold. In some implementations, the transmitter location selector 108 may select a set of more than two peaks. The selected peaks may represent received acoustic signals from the transmitting device 104. In particular, the peaks may represent acoustic signals that propagate to the mobile computing device 102 either directly or after having been reflected by one or more reflective surface in the environment in which the transmitting device 104 and the mobile computing device 102 are located.

The transmitter location selector 108 may further assign respective transmitter locations to the peaks. In particular, the transmitter location selector 108 may access acoustic model data 114 to assign the transmitter locations. The acoustic model data 114 may be stored, for instance, at a remote computing device, such as a server device. The remote computing device 104 may provide the acoustic model data to the mobile computing device 102, for instance, through communication via a network 116. The acoustic model data 114 may model acoustic properties of environments (e.g. one or more rooms, areas, spaces, etc.) associated with the real-time locating system 100. In particular, the acoustic model data 114 may specify a plurality of transmitter locations associated with the transmitting device 104. The transmitter locations may correspond to the location of the transmitting device 104 (e.g. the physical transmitting device), and to the locations of a plurality of virtual transmitting devices with respect to one or more reflective surfaces within the environment. As indicated, the virtual transmitting devices may represent reflection points within the environment wherein the acoustic signals propagate from the transmitting device and are reflected by the one or more reflective surfaces. In this manner, the transmitter locations associated with the virtual transmitting devices may include locations on the reflective surfaces at which the acoustic signals are reflected.

The transmitter locations may include locations associated with $0^{th}$ order reflections (e.g. signals associated with the transmitting device 104 that propagate directly to the mobile computing device 102), $1^{st}$ order reflections (e.g. signals associated with virtual transmitting devices that propagate from the transmitting device 104 and are reflected by one reflective surface), $2^{nd}$ order reflections (e.g. signals associated with virtual transmitting devices that propagate from the transmitting device 104 and are reflected by two reflective surfaces), etc. The acoustic model data 114 may be generated based at least in part on the dimensional specifications of the reflective surfaces within an environment (e.g. walls, ceilings, floors, furniture, etc.). The dimensional specifications may include data indicative of the location, size, orientation, and/or other suitable dimensional data associated with the reflective surfaces. In this manner, the reflective surfaces may be represented as reflective mirrors. In some implementations, attenuation factors associated with the reflective surface materials may be accounted for. As indicated, such attenuation factors are generally on the order of about 1 dB to about 10 dB, although other attenuation factors may be used.

The transmitting device 104 may be positioned in any suitable location within the environment. For instance, the transmitting device 104 may be mounted on or otherwise attached to a reflective surface within the environment. The location, orientation, and directivity of the transmitting device 104 within the environment may affect the placement and the number of transmitter locations specified by the acoustic model. In this manner, the transmitting device 104 may be arranged with respect to the environment so as to facilitate an acoustic model having a suitable number and configuration of transmitter locations. In particular, in an acoustic model specifying a large number of transmitter locations, two or more of the transmitter locations may overlap such that they are not individually observable. It can be advantageous to limit the number of transmitter locations such that each transmitter location is distinct and can be observed individually. It can also be advantageous for an acoustic model to specify transmitter locations arranged in one or more linear arrays on opposing reflective surfaces (e.g. opposing walls, floor-ceiling, etc.). Such an arrangement can facilitate a more accurate and efficient transmitter location assignment by the transmitter location selector 108. In this manner, the transmitting device 104 may include a directional transducer, and can be oriented with respect to the environment such that few reflective surfaces are excited. In particular, to achieve a desired acoustic model of the environment, the transmitting device 104 can be placed, for instance, immediately below a ceiling or above a floor and pointing to the closest opposite wall, in a corner immediately below a ceiling, or in other suitable location.

As indicated, the transmitter location selector 108 may be configured to assign a transmitter location to each peak from the selected set of peaks based at least in part on the acoustic model data 114. In particular, the assignment can indicate an estimate of the most likely candidate transmitter locations responsible for the respective signal peaks as received by the mobile computing device 102. In this manner, the assignment can be determined based at least in part on the orientation of the mobile computing device 102, the directivity of the transducer(s) (e.g. microphone configured to receive the acoustic signals) of the mobile computing device 102, the directivity of the transducer of the transmitting device 104, and/or the transmitter locations as specified by the acoustic model data 114. In some implementations, the assignment can be determined based at least in part on the reflection orders associated with the transmitter locations. For instance, in such implementations, the pool of transmitter locations that can be assigned can be restricted to lower order transmitter locations (e.g. $0^{th}$ order and $1^{st}$ order transmitter locations). As another example, each peak can be associated with one or more reflection orders such that only transmitter locations associated with that reflection order can be assigned to the respective peaks.

The model path generator 110 may be configured to generate a model path trace based at least in part on the transmitter location assignments. The model path generator 110 may determine the model path trace for a candidate location of the mobile computing device 102 based at least in part on the orientation of the mobile computing device 102 at the candidate position with respect to each transmitter location (as specified by the acoustic model data 114) and the distance traveled by the acoustic signals (e.g. the selected peaks). As discussed above, in some implementations, one or more model path traces can be dynamically generated for one or more respective candidate locations of the mobile computing device. The model path trace for a candidate location can be an estimate of the acoustic response of an environment (e.g. room—for a room, the model path trace may be thought of as a room response function) with respect to acoustic signals transmitted by one or more transmitting devices and received by the mobile computing device at the candidate location. The model path trace can be estimated from the received acoustic signals by deconvolution with the transmitted acoustic signal. In this manner, a model path trace may be an equivalent of the magnitude of the signal received by the mobile computing device at the candidate location of the mobile computing device due to an infinitesimal burst of input energy (Dirac function). More particularly, as will be described and depicted with respect to FIG. 3 below, the model path trace may be an estimate of the magnitude of acoustic signals as a function of time as would be received by the mobile computing device if the mobile computing device were located at the candidate location and if the acoustic signals were the result of an infinitesimal burst of input energy (Dirac function). Thus, the model path trace can be an estimate of the magnitude of acoustic signals as a function of time as would be received by the mobile computing device 102 if the mobile computing device 102 were located at the candidate location and if the acoustic signals resulted from an infinitesimal burst of input energy (Dirac function). In this manner, the model path trace can be a time domain representation of the magnitude of such estimated acoustic signals. In particular, the model path generator 110 may estimate the amplitude and timing of the received signals based at least in part on the distance traveled of the acoustic signals (e.g. from the transmitting device 102 to the candidate location) and the orientation of the mobile computing device 102 in view of the angular sensitivity (e.g. directivity) of the transducer of the mobile computing device 102 and/or transmitting device 104. The model path generator 110 may estimate the distance traveled by the acoustic signals based at least in part on the time difference of arrival between the selected peaks of the received acoustic signals and the correlation of the assigned transmitter locations with the respective peaks. The model path generator 110 may generate the model path trace for the candidate position by implementing synchronization signals with signals representing the estimated amplitudes, such that the model path trace represents the timing and amplitude of the model path trace.

As noted above, the model path trace approach has various benefits over other approaches. The model path trace is the response function of the environment resulting from an input Dirac function signal, i.e., the impulse response of the environment. Thus, while other approaches use signatures that are inseparable from the source signal used to generate them, the model path trace approach described herein results in a model path trace (i.e., environment response function) that is separate from the type of source signal and coding used to generate the resulting signal. Thus, rather than reflecting in part the source signal used, the model path trace is attributable only to the environment, rather than a function that also incorporates the properties of the source signal used. Put another way, the model path trace is decoupled from the source signal and the transducer used to generate the source signal, and is a manifestation of only the acoustic environment itself. The model path trace offers another benefit over other approaches in that it relies on both the amplitude as well as the timing information associated with the environment response function. Other approaches rely on a signature that highlights the timing of various peaks in the signature, where the peaks are linked to various multipath signals. By relying on both the amplitude as well as specific time information, the model path trace approach is richer in information and improves the quality of the resulting location determination. In addition to the benefits of the model path trace approach, some embodiments also incorporate the directionality of the microphone used to receive the acoustics signals to further enhance the location determination. While microphones are often omnidirectional, these same microphones become directional at higher acoustic frequencies (e.g., ultrasonic frequencies). Thus, given that an acoustic environment hosts a number of multipath signals that are received, incorporation of the directionality of the microphone can further improve the resulting location determination system. For example, the microphone of an iPhone (and other similar devices) are omnidirectional at lower audio frequencies, but are directional at ultrasonic frequencies. By incorporating a predetermined directional response of such a microphone, the location determination system is further enhanced.

The location estimator 112 may estimate the location of the mobile computing device 102 based at least in part on the model path trace. For instance, the location estimator 110 may compare the model path trace to the received acoustic signals to determine how well the model path trace corresponds to the received acoustic signals. The location estimator 112 may compare the model path trace to the received acoustic signals by determining a least squares error sum between the model path trace and the received acoustic signals. In some implementations, the location estimator 112 may perform a weighted least squares error sum between the model path trace and the received acoustic signals. In some implementations, the location estimator 112 may determine the correlation between the model path trace and the received acoustic signals.

In some implementations, model path trace generator 110 may be configured to generate model path traces for a plurality of candidate locations of the mobile computing device 104. The location estimator 112 may estimate the location of the mobile computing device 104 by comparing the model path traces for each candidate location to the received acoustic signals. The location estimator 112 may select one of the candidate locations as the location estimate of the mobile computing device 104 based at least in part on the comparisons.

More particularly, in such implementations, the environment may be partitioned into a three-dimensional search space that includes a plurality of candidate locations. Each candidate location can represent, for instance, an area or region of some resolution within the environment, such that the environment is partitioned or divided into a plurality of candidate locations. In this manner, in some implementations, the model path trace generator 110 may generate model path traces for each possible candidate location within the environment, and the location estimator 112 may compare each model path trace to the received acoustic signals to determine an estimate of the location of the mobile computing device 104. In some implementations, the candidate locations for which model path traces are generated may be selected in accordance with a global optimization problem. In this manner, the location estimator 112 may solve the global optimization problem to determine a global minimum with respect to model path traces generated for one or more candidate locations (e.g. selected based at least in part on the optimization) and the received acoustic signals. In some implementations, the candidate locations for which model path traces are generated may be selected in accordance with one or more local optimization problems. In such implementations, the candidate locations may be selected randomly (or pseudo-randomly), and local optimizations may be solved with respect to each selected candidate location until a suitable solution is identified.

In some implementations, the space in which candidate locations may be searched may include the entire environment in which the transmitting device 102 is located. In some implementations, the search space can be restricted to a surface of a hyperboloid associated with a pair of transmitter locations. The hyperboloid can be determined based at least in part on the locations of the assigned transmitter locations and the time difference of arrival between the selected peaks. The hyperboloid can be generated from a hyperbola, which can be represented by the below equation:

$$\frac{x^2}{a} - \frac{y^2}{b} = \frac{x^2}{\Delta d^2/4} - \frac{y^2}{D^2/4 - \Delta d^2/4} = 1.$$

wherein D equals the time difference of arrival between the two peaks, and the transmitter locations are both on the x-axis at x=D/2 and x=−D/2, respectively.

In such implementations, the model path generator 110 may generate model path traces for one or more candidate locations located on the surface of the hyperboloid. The location estimator 112 may compare the generated model path traces to the received acoustic signals to determine a least squares error sum, weighted least squares error sum, correlation, etc. between the respective model path traces and the received acoustic signals. In this manner, in some implementations, the location estimator 112 may search the hyperboloid surface by determining the candidate location on the hyperboloid surface yielding the minimum least squares difference between the received acoustic signals and the model path trace generated for the location on the hyperboloid surface. In some implementations, the location estimator 112 may determine the location on the hyperboloid surface yielding the weighted minimum least squares difference between the model path trace and the received acoustic signals. In some implementations, the location estimator 112 may determine the location on the hyperboloid surface yielding the highest correlation between the model path trace and the received acoustic signals.

In some implementations, the search of the surface of the hyperboloid can be restricted to a particular height or height range. More particularly, the location estimator 112 may estimate the height of the mobile computing device 102 with respect to the environment. Such height estimation can be predetermined, for instance, based on the assumption that users generally carry mobile computing devices in their hands or in their pockets. In some implementations, the location estimator 112 may dynamically determine the height estimation, for instance, using one or more pressure sensors onboard the mobile computing device. In this manner, the two-dimensional search on the surface of the hyperboloid can be restricted to a search on the intersection of a constant height plane and the hyperboloid, which effectively results in a one-dimensional search on a hyperbola.

In some implementations, upon a determination of the location providing the best match between the model path trace and the received acoustic signals, the location estimator 112 can compare the sound pressure levels between the model path trace and the received acoustic signals at the best match location to determine a sound pressure level difference between the model path trace and the received acoustic signals at the best match location. In this manner, the location estimator 112 may determine an absolute sound pressure level for the model path trace and the received acoustic signals, or the location estimator may determine a relative sound pressure level between the model path trace and the received acoustic signals. More particularly, the location estimator 112 may determine the absolute sound pressure level in implementations wherein the location estimator determines the minimum least squares difference, and the location estimator 112 may determine the relative sound pressure level in implementations wherein the location estimator 112 determines the highest correlation. The sound pressure levels can indicate a degree of similarity between the model path trace and the received acoustic signals.

In some implementations, the mobile computing device 102 may further determine a velocity of the mobile computing device 102 based at least in part on the received acoustic signals. When the mobile computing device 102 is in motion (e.g. being carried by a user in motion, attached to an object in motion, etc.), such motion can induce dramatic phase shifts of the acoustic signals received by the mobile computing device 102. The phase shifts can correspond to the path traveled between the transmitting device 104 and the mobile computing device 102 (e.g. direct propagation, reflection by one or more reflective surfaces, etc.). The phase and angular phase velocities of such signals are proportional to the product of the motion vector and the path directional vector of the mobile computing device 102. Upon an initial location estimate by the location estimator 102, the mobile computing device 102 may determine the directional path vector, path magnitude, and path instance in time of the acoustic signals associated with each transmitter location. The mobile computing device 102 may use these parameters to reconstruct IQ signal data and/or sampled signal data associated with the received acoustic signals as a sum of overlapping paths. The mobile computing device 102 may determine the angular phase velocities of the acoustic signals associated with each transmitter location. More particularly, the mobile computing device 102 may determine the angular phase velocities using a non-linear complex-valued curve fit (e.g. Levenberg-Marquadt or other suitable curve fit) based at least in part on the IQ signal data and/or sampled signal data, the magnitude of the received acoustic signals, the time difference of arrival between the signal peaks associated with each transmitter location, and path normal direction vectors for each path between the transmitting device 104 and the mobile computing device 102. The velocity of the mobile computing device can be estimated based at least in part on the relative angular phase velocities of the received acoustic signals as estimated by curve fit procedure.

In some implementations, multiple combinations of transmitter assignments can be performed to determine the most likely location of the mobile computing device 102. In such implementations, the transmitter location selector 108 may select multiple sets of peaks from the received acoustic signals and/or assign multiple combinations of transmitter locations to the selected peaks. The model path generator 110 may generate respective model path traces for each transmitter location assignment combination, and the location estimator 112 may compare each generated model path trace to the received acoustic signals according to example aspects of the present disclosure. The location estimator 112 may further determine the most likely location of the mobile computing device 102 based at least in part on the comparisons. In this manner, the location estimator 112 may determine the model path trace that most closely matches the received acoustic signals, such that the location for which such model path trace was generated can be estimated as the location of the mobile computing device 102. In some implementations, the location estimator 112 may select the first model path trace that matches the received acoustic signals to a sufficient degree and estimate the location of the mobile computing device as the location associated with the selected model path trace.

Figure 2:
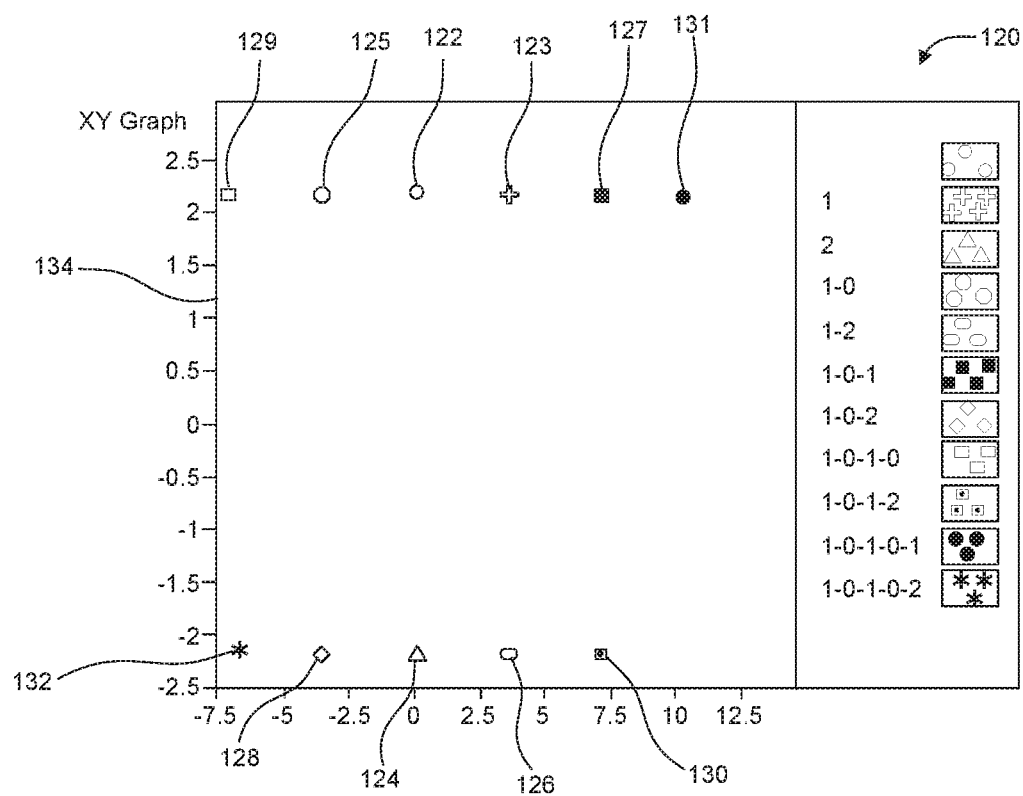
FIG. 2 depicts a graphical representation of an example acoustic model according to example aspects of the present disclosure.

FIG. 2 depicts an example graphical representation of an acoustic model 120 of an environment 134 according to example aspects of the present disclosure. Data indicative of the acoustic model 120 may be included, for instance, in the acoustic model data 114 depicted in FIG. 1. As shown, acoustic model 120 includes transmitter location 122 and transmitter locations 123, 124, 125, 126, 127, 128, 129, 130, 131, and 132 arranged in dual, opposing linear arrays. As indicated, acoustic models in accordance with example aspects of the present disclosure can specify transmitter locations on various reflective surfaces within an environment. The environment 134 corresponds to a corridor with two walls, a floor and a ceiling. In this regard, the acoustic model 120 specifies transmitter locations 122, and 123-132 on opposing walls within the environment 134. Transmitter location 122 represents a physical transmitting device (e.g. transmitting device 104 depicted in FIG. 1) mounted or otherwise positioned on a first wall within the environment 134, while transmitter locations 123-132 represent virtual transmitting devices located at various reflection points on the first wall and a second, opposing wall. In some implementations, each transmitter location 122, 123-132 can be interpreted based at least in part on the reflection order associated with the respective transmitting device 122, 123-132. More particularly, each transmitting device 122, 123-132 can be associated with an acoustic signal that either propagates directly from a physical transmitting device (e.g. $0^{th}$ order reflection), or an acoustic signal that is reflected one or more times by one or more reflective surfaces (e.g. $1^{st}$ order reflection, $2^{nd}$ order reflection, $3^{rd}$ order reflection, etc.). As shown in the legend of the plot of acoustic model 120 depicted in FIG. 2, various reflective surfaces of the environment 134 are numbered from 0-2. The transmitter location 122 corresponds to a $0^{th}$ order reflection because the associated acoustic signal is not reflected by any reflective surfaces. Similarly, transmitter location 123 corresponds to a $1^{st}$ order reflection because it is reflected only by the reflective surface labeled "1." As another example, transmitter location 125 corresponds to a $2^{nd}$ order reflection because it is reflected by the reflective surface labeled "1," and the reflective surface labeled "0" (1-0, as depicted in the legend).

The acoustic model 120 plots the (x,y) coordinates of the acoustic signals associated with the transmitter locations within the environment. In particular, the top row of transmitter locations (e.g. transmitter locations 122, 123, 125, 127, 129, and 131) correspond to acoustic signals that are highly dominant compared to the bottom row of transmitter locations due to the closer proximity and the directional nature of the physical transmitting device.

The dual linear arrays of transmitting devices can be configured based at least in part on the location, orientation, and directivity of the physical transmitting device associated the transmitter location 122. As indicated, the acoustic model 120 can be determined based at least in part on dimensional specifications associated with a plurality of reflective surfaces (e.g. walls, ceilings, floors, furniture, light fixtures, ceiling fans, etc.) located within the environment 134. More particularly, the dimensional specifications can include data indicative of the location, size, orientation (e.g. direction normal), attenuation, and/or other suitable characteristic of the reflective surfaces. Such dimensional specifications can be used to correlate the reflection points with relative locations within the environment.

It will be appreciated that the acoustic model 120 depicted in FIG. 2 is intended for illustrative purposes only. It will be further appreciated that various other suitable acoustic models can be determined for the environment 126 and for various other environments. For instance, other suitable acoustic models can specify more or fewer transmitter locations, and/or can specify the transmitter locations at other suitable locations within the environment 126 or other environment.

Figure 3:
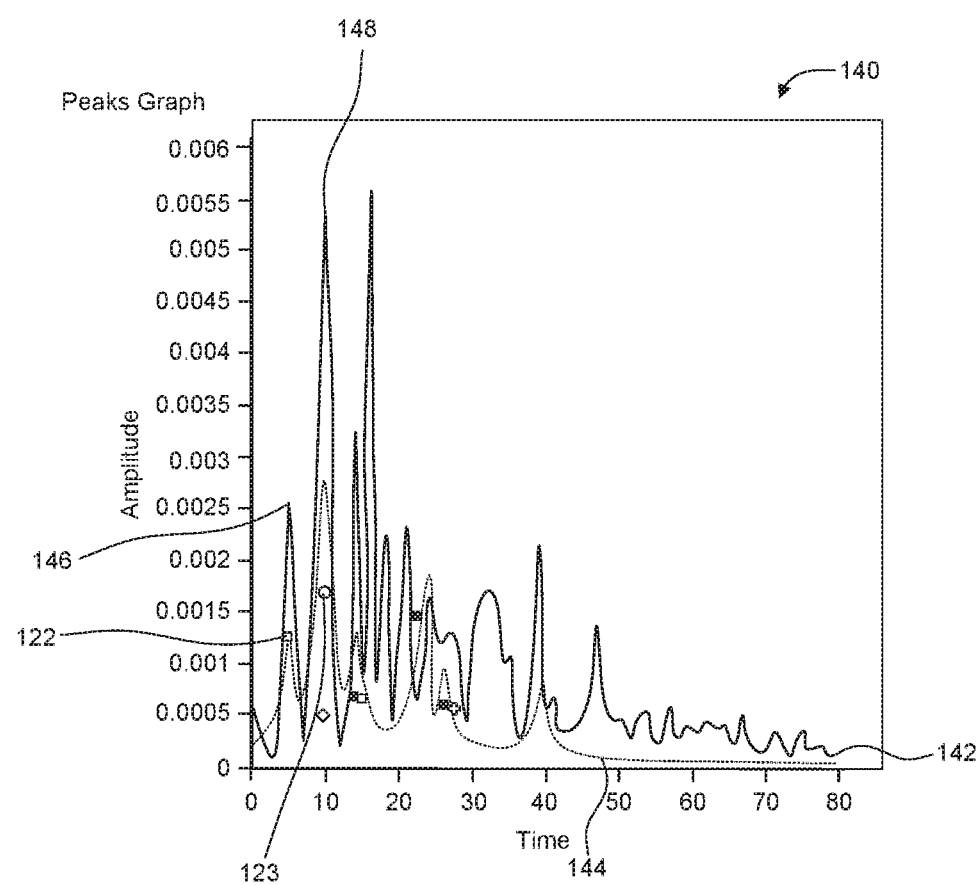
FIG. 3 depicts a graphical representation of example acoustic signals and an example model path trace according to example aspects of the present disclosure.

FIG. 3 depicts a graphical representation 140 of example received acoustic signals 142 and an example model path trace 144 generated according to example aspects of the present disclosure. More particularly, the graphical representation 140 depicts the amplitudes of the acoustic signals 142 and the model path trace 144 with respect to time. The received acoustic signals 142 can be received from one or more transmitting devices (e.g. transmitting device 104), after either propagating directly to a mobile computing device or being reflected by one or more reflective surfaces within an environment in which the one or more transmitting devices and the mobile computing device are located. The model path trace 144 can be generated for a candidate location of the mobile computing device based at least in part on an assignment of transmitter locations to two or more selected peaks from the received acoustic signals 142. As discussed above, in some implementations, one or more model path traces can be dynamically generated for one or more respective candidate locations of the mobile computing device. The model path trace for a candidate location can be an estimate of the acoustic response of an environment (e.g. room—for a room, the model path trace may be thought of as a room response function) with respect to acoustic signals transmitted by one or more transmitting devices and received by the mobile computing device at the candidate location. The model path trace can be estimated from the received acoustic signals by deconvolution with the transmitted acoustic signal. In this manner, a model path trace may be an equivalent of the magnitude of the signal received by the mobile computing device at the candidate location of the mobile computing device due to an infinitesimal burst of the mobile input energy (Dirac function). More particularly, as will be described and depicted with respect to FIG. 3 below, the model path trace may be an estimate of the magnitude of acoustic signals as a function of time as would be received by the mobile computing device if the mobile computing device were located at the candidate location and if the acoustic signals were the result of an infinitesimal burst of input energy (Dirac function). Thus, the model path trace 144 is an estimate of the magnitude of acoustic signals as a function of time as would be received by a mobile computing device (e.g. mobile computing device 102) if the mobile computing device were located at a candidate location and if the acoustic signals resulted from an infinitesimal burst of input energy (Dirac function). In this manner, the model path trace is a time domain representation of the magnitude of such estimated acoustic signals, such that the model path trace 144 can be aligned with and compared to the received acoustic signals 142.

As noted above, the model path trace approach has various benefits over other approaches. The model path trace is the response function of the environment resulting from an input Dirac function signal, i.e., the impulse response of the environment. Thus, while other approaches use signatures that are inseparable from the source signal used to generate them, the model path trace approach described herein results in a model path trace (i.e., environment response function) that is separate from the type of source signal and coding used to generate the resulting signal. Thus, rather than reflecting in part the source signal used, the model path trace is attributable only to the environment, rather than a function that also incorporates the properties of the source signal used. Put another way, the model path trace is decoupled from the source signal and the transducer used to generate the source signal, and is a manifestation of only the acoustic environment itself. The model path trace offers another benefit over other approaches in that it relies on both the amplitude as well as the timing information associated with the environment response function. Other approaches rely on a signature that highlights the timing of various peaks in the signature, where the peaks are linked to various multipath signals. By relying on both the amplitude as well as specific time information, the model path trace approach is richer in information and improves the quality of the resulting location determination. In addition to the benefits of the model path trace approach, some embodiments also incorporate the directionality of the microphone used to receive the acoustics signals to further enhance the location determination. While microphones are often omnidirectional, these same microphones become directional at higher acoustic frequencies (e.g., ultrasonic frequencies). Thus, given that an acoustic environment hosts a number of multipath signals that are received, incorporation of the directionality of the microphone can further improve the resulting location determination system. For example, the microphone of an iPhone (and other similar devices) are omnidirectional at lower audio frequencies, but are directional at ultrasonic frequencies. By incorporating a predetermined directional response of such a microphone, the location determination system is further enhanced.

In particular, graphic representation 140 depicts peaks 146 and 148 of the received acoustic signals 142. Graphic representation 140 further indicates the assignment of transmitter locations to the respective peaks 146, 148. The transmitter location assignment can be determined using transmitter locations specified by an acoustic model (e.g. acoustic model 120 of FIG. 2) determined for the environment. In particular, transmitter location 122 (e.g. the $0^{th}$ order transmitter location) is assigned to the peak 146, and the transmitter location 123 (e.g. a $1^{st}$ order transmitter location) is assigned to the peak 148. As shown, additional transmitter locations can be assigned to additional peaks from the received acoustic signals 142. In some implementations, the additional assignments can be determined based at least in part on the initial assignment of transmitter locations 122 and 123 to the peaks 146 and 148, respectively.

Figure 4:
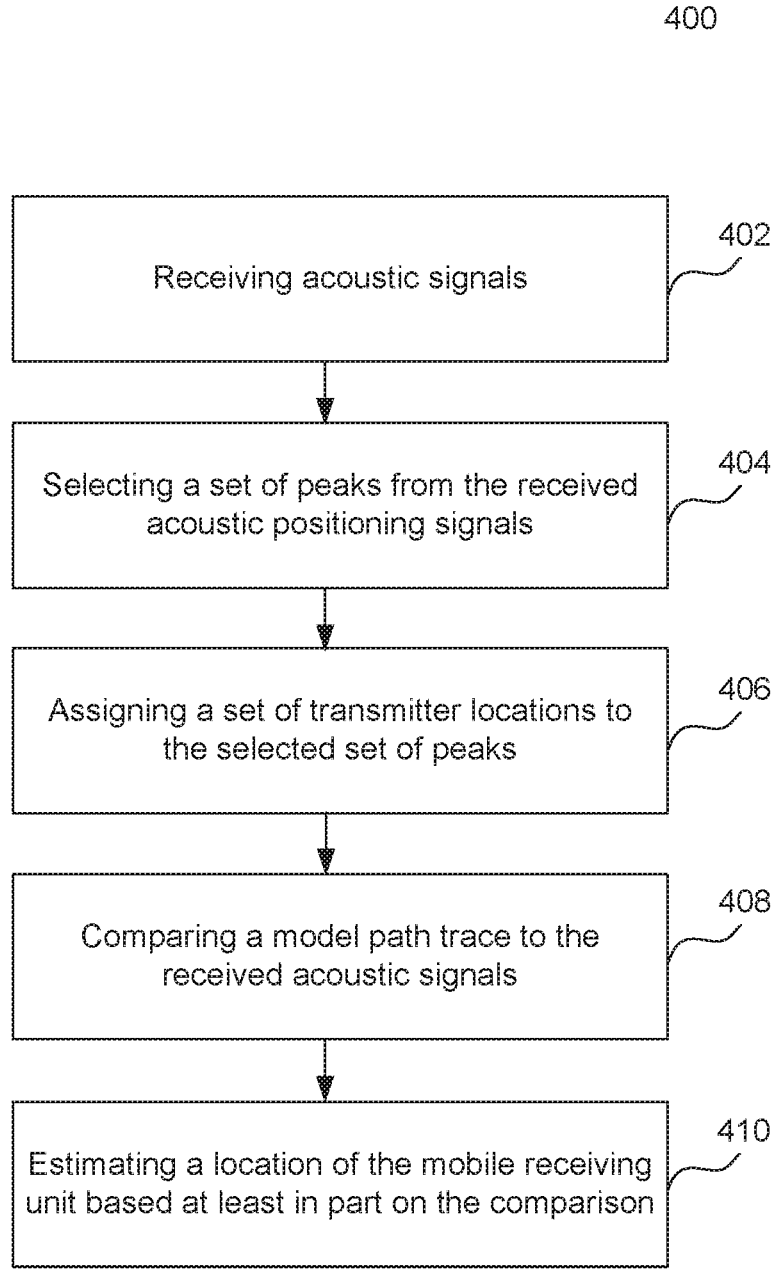
FIG. 4 depicts a flow diagram of an example method of estimating a location of a mobile computing device according to example aspects of the present disclosure.

FIG. 4 depicts a flow diagram of an example method (400) of estimating a location of a mobile computing device according to example aspects of the present disclosure. The method (400) can be implemented by one or more computing devices, such as one or more of the computing devices described with respect to FIG. 7. In some implementations, the method (400) can be implemented by the transmitter location selector 108, the model path generator 110, and/or the location estimator 112 of FIG. 1. In addition, FIG. 4 depicts steps performed in a particular order for purposes of illustration and discussion. Those of ordinary skill in the art, using the disclosures provided herein, will understand that the steps of any of the methods described herein can be adapted, rearranged, expanded, omitted, or modified in various ways without deviating from the scope of the present disclosure.

At (402), the method (400) can include receiving acoustic signals. For instance, the acoustic signals can be transmitted by one or more acoustic transmitting devices. In some implementations, the acoustic signals can be transmitted at various intervals (e.g. periodically) by a single transmitting device having a single acoustic transducer configured to transmit ultrasonic signals. The acoustic signals can be received by a mobile computing device located within a broadcast range of the one or more transmitting devices.

At (404), the method (400) can include selecting a set of peaks from the received acoustic signals. More particularly, the set of peaks can be selected from a representation of the amplitude of the received acoustic signals with respect to time. In this manner, the peaks can be selected with the purpose of selecting signals that were transmitted by the one or more transmitting devices. In some implementations, selecting the peaks can include selecting the peaks based at least in part on the amplitude of the peaks and/or the order of arrival of the peaks. For instance, in some implementations, a set of two peaks can be selected that represent the first two peaks to arrive that have an amplitude greater than a threshold. In some implementations, the selected set of peaks can include more than two peaks.

At (406), the method (400) can include assigning a set of transmitter locations to the set of selected peaks. In this manner, a first transmitter location can be assigned to a first peak and a second transmitter location can be assigned to a second peak. The transmitter locations may be specified in an acoustic model representing the environment. The acoustic model may specify a plurality of transmitter locations within the environment. Assigning the transmitter locations can include assigning the transmitter locations to the respective peaks based at least in part on an orientation of the mobile computing device, a directivity or angular sensitivity of the transducer (e.g. microphone) of the mobile computing device, a directivity or angular sensitivity of the transducer(s) of the transmitting device(s), a sound pressure level at which the transmitting device transmits the acoustic signals, the transmitter locations specified by the acoustic model and/or other suitable parameter. In some implementations, the assignment can be determined based at least in part on the reflection order associated with the transmitter locations.

At (408), the method (400) can include comparing a model path trace to the received acoustic signals. For instance, the model path trace may be determined for one or more candidate positions of the mobile computing device based at least in part on the assignment of the transmitter locations to the selected peaks. The model path trace can be an estimate of acoustic signals received at the candidate position based at least in part on the assignment of the transmitter locations to the selected peaks. More particularly, the model path trace can be determined based at least in part on a distance traveled by the acoustic signals (as determined from a time delay between the selected peaks), and a relative orientation of the mobile computing device to some or all of the transmitter locations specified by the acoustic model at the candidate position. In some implementations, comparing the model path trace to the received acoustic signals can include determining a least squares error sum between the model path trace and the received acoustic signals, a weighted least squares error sum between the model path trace and the received acoustic signals, and/or a correlation between the model path trace and the received acoustic signals.

At (410), the method (400) can include estimating a location of the mobile computing device based at least in part on the comparison between the model path trace and the received acoustic signals. For instance, if the comparison reveals a sufficient degree of similarity between the model path trace and the received acoustic signals, the candidate position associated with the model path trace can be chosen as the estimated location of the mobile computing device. As will be described in more detail with respect to FIGS. 5 and 6, in some implementations, model path traces can be generated for multiple candidate locations, and each model path trace can be compared to the received acoustic signals. In this manner, the candidate locations may be selected from a search space that includes at least a subset of the environment in which the transmitting device is located. For instance, the search space can correspond to the entire environment (e.g. three-dimensional search space), or to a surface of a hyperboloid generated based at least in part on the assigned transmitter locations (e.g. two-dimensional search space), or other suitable search space. In such implementations, estimating the location of the mobile computing device can include estimating the location of the mobile computing device based at least in part on one or more of the comparisons.

Figure 5:
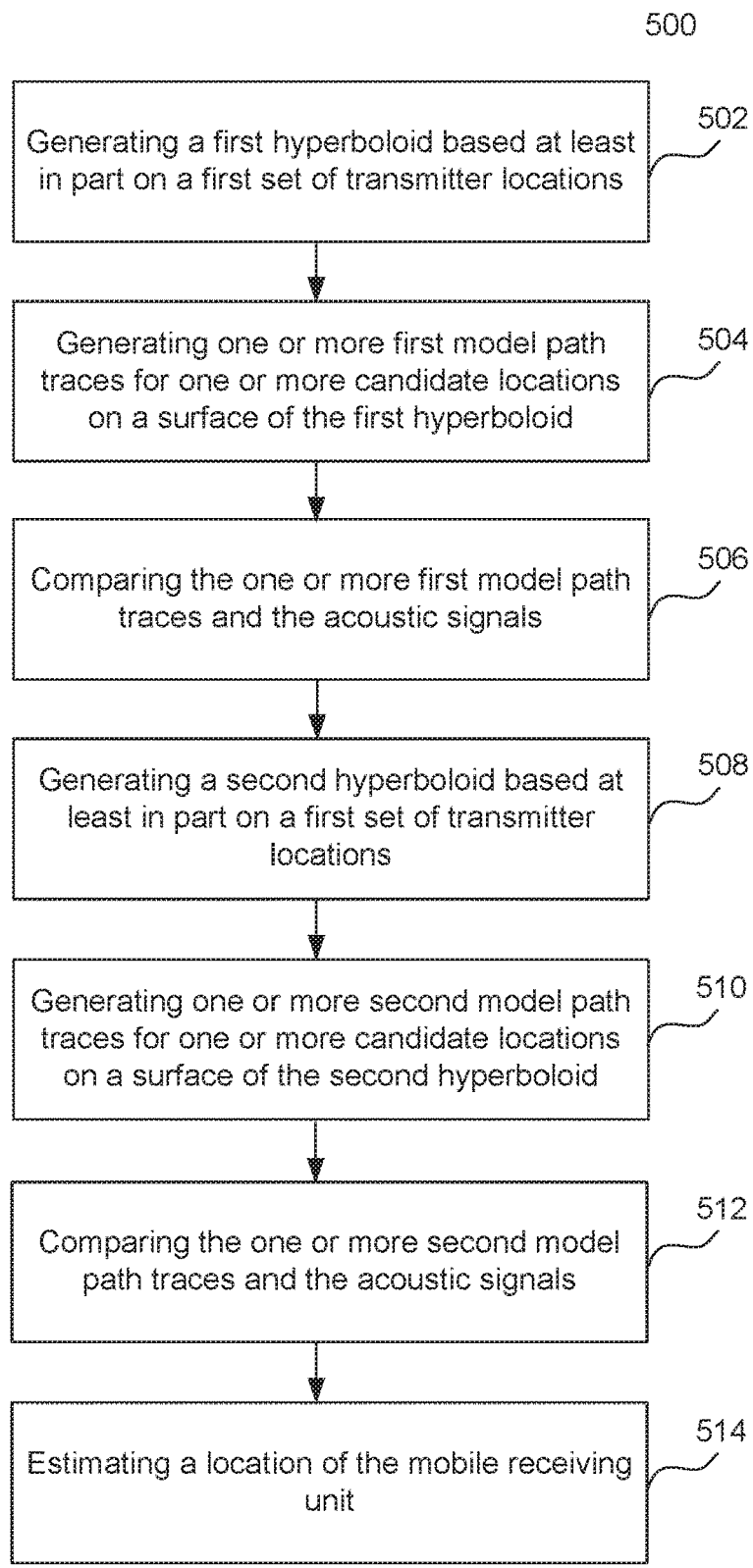
FIG. 5 depicts a flow diagram of an example method of estimating a location of a mobile computing device according to example aspects of the present disclosure.

FIG. 5 depicts a flow diagram of an example method (500) of estimating a location of a mobile computing device according to example aspects of the present disclosure. The method (500) can be implemented by one or more computing devices, such as one or more of the computing devices described with respect to FIG. 7. In some implementations, the method (500) can be implemented by the model path generator 110 and/or the location estimator 112 of FIG. 1. In addition, FIG. 5 depicts steps performed in a particular order for purposes of illustration and discussion.

At (502), the method (500) can include generating a first hyperboloid based at least in part on a first set of transmitter locations. The first set of transmitter locations may be respectively assigned to the selected peaks associated with the received acoustic signals (e.g. as selected in (204) of the method (200)). The hyperboloid can be generated by rotating a hyperbola about its axis to create a suitable searchable space. As indicated above, the hyperbola can be constructed based at least in part on the first set of transmitter locations and the time difference of arrival between the selected peaks.

At (504), the method (500) can include generating one or more first model path traces for one or more respective candidate locations located on a surface of the hyperboloid. As indicated, the first model path trace(s) may be generated based at least in part on the orientation of the mobile computing device with respect to some or all of the transmitter locations specified by the acoustic model. The first model path trace may further be determined based at least in part on the distance traveled by the acoustic signals received by the mobile computing device (e.g. as determined based at least in part on the time difference of arrival between the peaks of the selected set of peaks and the respective candidate locations), and/or a directivity or angular sensitivity of the respective transducers of the transmitting device and the mobile computing device.

At (506), the method (500) can include comparing the first model path trace(s) to the received acoustic signals. Comparing the first model path trace(s) to the received acoustic signals can include determining least squares error sums, weighted least squares error sums, and/or correlations between the respective model path traces and the received acoustic signals.

At (508), the method (500) can include generating a second hyperboloid based at least in part on a second set of transmitter locations. The second set of transmitter locations may be a different set of transmitter locations assigned to the selected set of peaks, or a difference set of selected peaks. In this manner, the second set of transmitter locations can include one or more transmitter locations that are assigned to different peak(s) relative to the first set of transmitter locations. The second hyperboloid can be generated by rotating a second hyperbola about its axis to create a suitable searchable space. The hyperbola can be constructed based at least in part on the second set of transmitter locations and the time difference of arrival between the selected peaks.

At (510), the method (500) can include generating one or more second model path traces for one or more respective candidate locations located on a surface of the second hyperboloid. As indicated, the second model path trace(s) may be generated based at least in part on the orientation of the mobile computing device with respect to some or all of the transmitter locations specified by the acoustic model. The first model path trace can further be determined based at least in part on the distance traveled by the acoustic signals received by the mobile computing device (e.g. as determined based at least in part on the time difference of arrival between the peaks of the selected set of peaks and the respective candidate locations), and/or a directivity or angular sensitivity of the respective transducers of the transmitting device and the mobile computing device.

At (512), the method (500) can include comparing the second model path trace(s) to the received acoustic signals. Comparing the second model path trace(s) to the received acoustic signals may include determining least squares error sums, weighted least squares error sums, and/or correlations between the respective model path trace(s) and the received acoustic signals.

At (514), the method (500) can include estimating a location of the mobile computing device based at least in part on the comparisons of the first and/or second model path trace(s) to the received acoustic signals. More particularly, the location of the mobile computing device may be estimated to be the candidate location associated with the model path trace (e.g. the first or second model path trace) that most closely matches the received acoustic signals, as evidenced by the searches of the first and second hyperboloid surfaces. For instance, the model path trace that most closely matches the received acoustic signals can be the model path trace associated with the hyperboloid yielding the lowest least squares difference, the highest correlation, etc. In some implementations, the best match can be determined based at least in part on the sound pressure levels (e.g. absolute sound pressure level and/or relative sound pressure level) of the model path traces and the received acoustic signals. For instance, a sound pressure level difference between the respective model path traces and the received acoustic signals can be calculated. The location of the mobile computing device can be estimated to be the candidate location associated with the model path trace having the lowest sound pressure level difference.

In this manner, the location of the mobile computing device can be determined by searching the surface of the first and/or second hyperboloids to determine a candidate location on the first or second hyperboloid surface having an associated model path trace that closely resembles the received acoustic signals. The candidate locations may be selected from a set of locations on the surface of the hyperboloid(s). In various implementations, searching the surface of the first and second hyperboloids can include determining a location on the hyperboloid surface yielding the minimum least squares difference, minimum weighted least squares difference, or highest correlation between the model path trace generated for that location and the received acoustic signals. It will be appreciated that in some implementations, only the first hyperboloid may be searched to estimate the location of the mobile received unit. For instance, if the first hyperboloid yields a candidate location having a model path trace that suitably matches the received acoustic signals, the method (500) can proceed from (506) to (514) without the need to generate the second hyperboloid, generate the second model path trace(s), or compare the second model path traces to the received acoustic signals.

Figure 6:
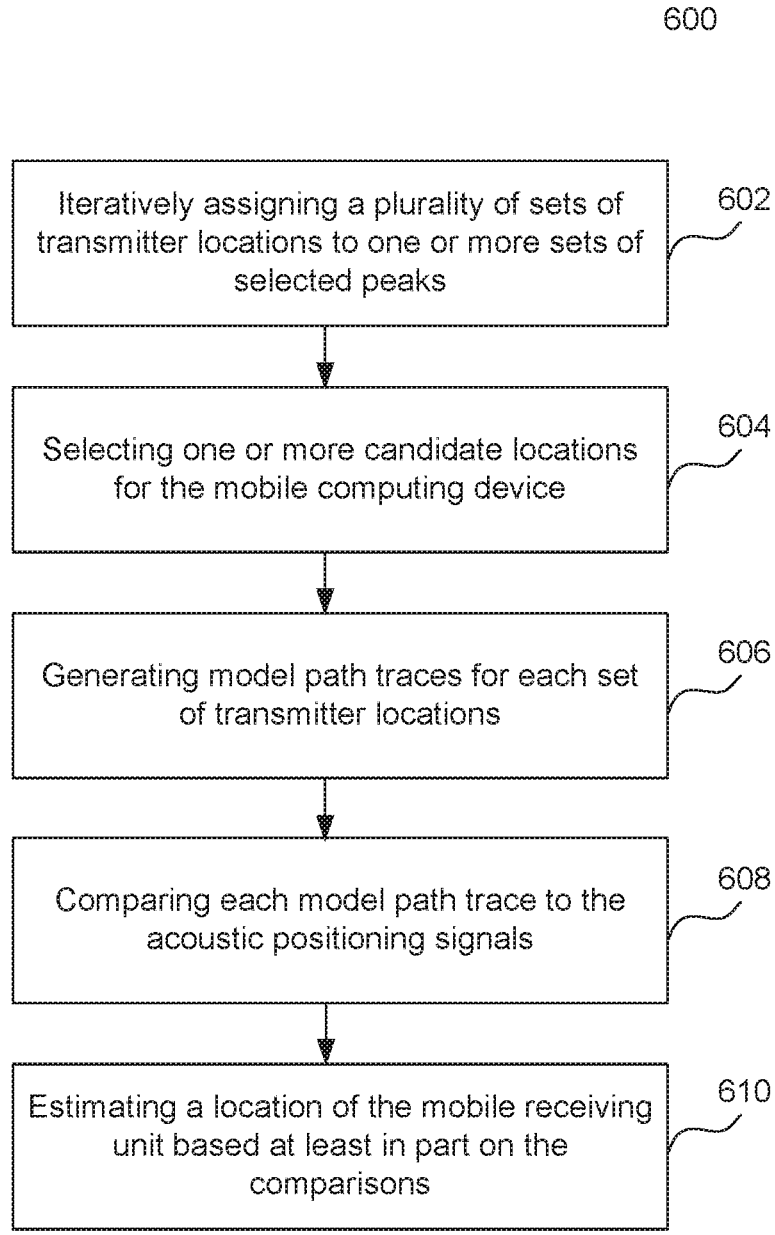
FIG. 6 depicts a flow diagram of an example method of estimating a location of a mobile computing device according to example aspects of the present disclosure.

As indicated, in some implementations, any suitable number of model path traces can be generated for any suitable number of transmitter location assignments to determine the location of the mobile computing device. For instance, FIG. 6 depicts a flow diagram of an example method (600) of estimating a location of a mobile computing device according to example aspects of the present disclosure. The method (600) can be implemented by one or more computing devices, such as one or more of the computing devices described with respect to FIG. 7. In some implementations, the method (300) can be implemented by the transmitter location selector 108, the model path generator 110 and/or the location estimator 112 of FIG. 1. In addition, FIG. 6 depicts steps performed in a particular order for purposes of illustration and discussion.

At (602), the method (600) can include iteratively assigning a plurality of sets of transmitter locations to one or more sets of selected peaks of the received acoustic signals. More particularly, iteratively assigning a plurality of sets of transmitter locations can include assigning each transmitter location of a first set of transmitter locations to a peak of a first set of selected peaks, and subsequently assigning each transmitter location of a second set of transmitter locations to a peak of the first set of selected peaks, etc. The second set of transmitter locations may include at least one different transmitter location than the first set of transmitter locations. In some implementations, the second set of transmitter locations may include the same transmitter locations as the first set of transmitter locations, but may assign one or more of the transmitter locations to a different peak relative to the assignments of the first set of transmitter locations. In this manner, multiple combinations of transmitter locations can be assigned to the selected set of peaks. In some implementations, the second set of transmitter locations can be assigned to a second set of selected peaks.

At (604), the method (600) can include selecting one or more candidate locations associated with the mobile computing device. The one or more candidate locations can be selected from a suitable search space within the environment in which the transmitter locations are located. In some implementations, the search space may correspond to the entire environment. In this manner, the candidate locations may be selected from any suitable location in the environment. For instance, the each location of a suitable resolution can be selected as a candidate location for the mobile computing device. In some implementations, the search space can be restricted to a subset of the environment. For instance, in some implementations, the search space can be restricted to a surface of one or more hyperboloids generated based at least in part on the assignments of the transmitter locations to the peaks. In this manner, the one or more candidate locations can be selected from locations corresponding to the surface of the hyperboloid(s).

In some implementations, the candidate positions can be selected in accordance with solving an optimization problem to determine the location of the mobile computing device. In some implementations, the optimization can be a global optimization wherein a global minimum is found. In such implementations, the candidate locations for which model path traces are generated may be selected based at least in part on the optimization problem with the object of determining a global minimum with respect to the environment. In some implementations, the optimization can include one or more local optimization problems. In such implementations, the candidate locations can be selected randomly, pseudo-randomly, or in other suitable manner, and local optimizations can be solved for each selected candidate location to determine a local minimum with respect to the candidate location.

At (606), the method (600) can include generating one or more model path traces for each set of assigned transmitter locations. Each model path trace may be generated for a different candidate position based at least on the assigned transmitter locations. The candidate locations can be selected from a suitable search space within the environment in which the transmitting device is located. In some implementations, the search space may include the entirety of the environment. In some implementations, the search space can be the surface of a hyperboloid determined based at least in part on the assigned transmitter locations.

At (608), the method (600) can include comparing each model path trace to the received acoustic signals. Comparing each model path trace to the acoustic signals can include determining a degree of similarity between each model path trace and the received acoustic signals. More particularly, comparing each model path trace to the received acoustic signals may include determining a least squares error sum, weighted least squares error sum, correlation, etc. between the model path traces and the received acoustic signals. In implementations, wherein an optimization is solved, the comparing of the model path traces to the received acoustic signals can be performed in accordance with the solving of the optimization. For instance, the generated model path traces may be compared to the received acoustic signals with the object of determining the global and/or local minima with respect to the optimization.

At (610), the method (600) can include estimating a location of the mobile computing device based at least in part on the comparisons. In particular, estimating the location of the mobile computing device may include selecting the candidate position associated with the model path trace that most closely resembles or matches the received acoustic signals as the location of the mobile computing device. The degree of the match between the model path traces and the received acoustic signals can be determined based at least in part on the comparisons. For instance, in some implementations, estimating the location of the mobile computing device may include determining the model path trace providing the minimum least squares difference, minimum least squares difference, highest correlation, etc. between the model path trace and the received acoustic signal.

Figure 7:
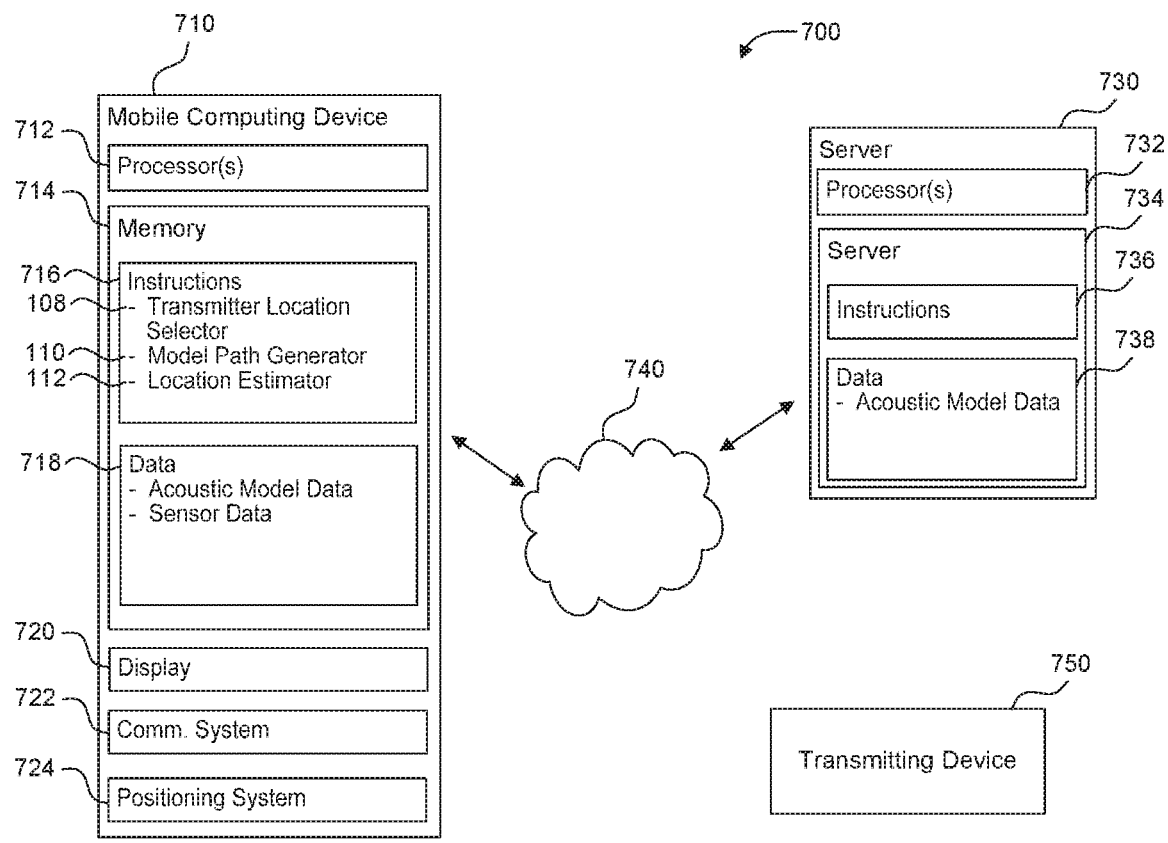
FIG. 7 depicts an example computing system according to example aspects of the present disclosure.

FIG. 7 depicts an example system 700 that can be used to implement the methods and systems of the present disclosure. In some implementations, the system 700 can be at least a portion of a real-time locating system configured to determine the locations of various suitable mobile computing devices. The system 700 can be implemented using a client-server architecture that includes a mobile computing device 710 that communicates with one or more remote computing devices, such as server 730. The system 700 can be implemented using other suitable architectures.

As shown, the system 700 can include a mobile computing device 710. The mobile computing device 710 can be any suitable type of mobile computing device, such as a smartphone, tablet, cellular telephone, wearable computing device, or any other suitable mobile computing device capable of being used in mobile operation. In some implementations, the mobile computing device can be a dedicated tag (e.g. passive or active) or other device for use in the real-time locating system. The mobile computing device 710 can include one or more processor(s) 712 and one or more memory devices 714.

The one or more processor(s) 712 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices, such as a system on a chip (SoC) or a SoC with an integrated RF transceiver. The one or more memory devices 714 can include one or more computer-readable media, including, but not limited to, non-transitory computer-readable media, RAM, ROM, hard drives, flash memory, or other memory devices.

The one or more memory devices 714 can store information accessible by the one or more processors 712, including instructions 716 that can be executed by the one or more processors 712. For instance, the memory devices 714 can store the instructions 716 for implementing one or more modules configured to implement a transmitter location selector 108, a model path generator 110, and/or a location estimator 112, and/or other suitable instructions.

Each of the transmitter location selector 108, model path generator 110, and location estimator 112 can include computer logic utilized to provide desired functionality. Thus, each of the transmitter location selector 108, model path generator 110, and location estimator 112 can be implemented in hardware, application specific circuits, firmware and/or software controlling a general purpose processor. In one embodiment, each of the transmitter location selector 108, model path generator 110, and location estimator 112 are program code files stored on the storage device, loaded into memory and executed by a processor, or can be provided from computer program products, for example computer executable instructions, that are stored in a tangible computer-readable storage medium such as RAM, hard disk or optical or magnetic media. The transmitter location selector 108, model path generator 110, and location estimator 112 can each correspond to one or more different programs, files, circuits, or sets of instructions. Likewise, two or more of the transmitter location selector 108, model path generator 110, and location estimator 112 can be combined into a single program, file, circuit, or set of instructions.

The instructions 716 can further include instructions for implementing a browser, for running a specialized application, or for performing other functions on the mobile computing device 710. For instance, the specialized application can be used to exchange data with server 730 over the network 740. The instructions 716 can include client-device-readable code for providing and implementing aspects of the present disclosure. For example, the instructions 716 can include instructions for implementing an application associated with the real-time locating system, or a third party application implementing wayfinding, asset tracking, or other services on the mobile computing device 710.

The one or more memory devices 714 can also include data 718 that can be retrieved, manipulated, created, or stored by the one or more processors 712. The data 718 can include, for instance, acoustic model data, sensor data, and/or other data.

The mobile computing device 710 can include various input/output devices for providing and receiving information from a user, such as a touch screen, touch pad, data entry keys, speakers, and/or a microphone suitable for voice recognition. For instance, the mobile computing device 710 can have a display 720 for presenting a user interface to a user.

The mobile computing device 710 can further include a positioning system 724. The positioning system 724 can be any device or circuitry for determining the position of remote computing device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system (e.g. using positioning sensors, such as an inertial measurement unit), a dead reckoning system, based on IP address, by using triangulation and/or proximity to cellular towers, Bluetooth hotspots, BLE beacons, Wi-Fi access points or Wi-Fi hotspots, Wi-Fi time-of-flight, and/or other suitable techniques for determining position.

The mobile computing device 710 can also include a network interface used to communicate with one or more remote computing devices (e.g. server 730) over a network 740. The network interface can include any suitable components for interfacing with one more networks, including for example, transmitters, receivers, ports, controllers, antennas, or other suitable components.

The mobile computing device 710 can further include a communication system used to communicate with one or more transmitting devices, such as transmitting device 750. The communication system can include, for instance, one or more transducers (e.g. microphone devices) configured to receive acoustic (e.g. ultrasonic) signals from the transmitting device 750.

In some implementations, the mobile computing device 710 can be in communication with a remote computing device, such as a server 730 over network 740. Server 730 can include one or more computing devices. The server 730 can include one or more computing devices, and can be implemented, for instance, as a parallel or distributed computing system. In particular, multiple computing devices can act together as a single server 730.

Similar to the mobile computing device 710, the server 730 can include one or more processor(s) 732 and a memory 734. The one or more processor(s) 732 can include one or more central processing units (CPUs), and/or other processing devices. The memory 734 can include one or more computer-readable media and can store information accessible by the one or more processors 732, including instructions 736 that can be executed by the one or more processors 732, and data 738. For instance, although the transmitter location selector 108, model path generator 110, and location estimator 112 are depicted in FIG. 7 as being included in the mobile computing device 710, in other implementations, one or more of the transmitter location selector 108, model path generator 110, and location estimator 112 can be included in the server 730.

The data 738 can be stored in one or more databases. The data can include acoustic model data and other data. The one or more databases can be connected to the server 730 by a high bandwidth LAN or WAN, or can also be connected to server 730 through network 740. The one or more databases can be split up so that they are located in multiple locales.

Server 730 can also include a network interface used to communicate with computing device 710 over network 740. The network interface can include any suitable components for interfacing with one more networks, including for example, transmitters, receivers, ports, controllers, antennas, or other suitable components.

Network 740 can be any type of communications network, such as a local area network (e.g. intranet), wide area network (e.g. Internet), cellular network, or some combination thereof. Network 740 can also include a direct connection between the mobile computing device 710 and server 730. Network 740 can include any number of wired or wireless links and can be carried out using any suitable communication protocol.

The system 700 can further include one or more transmitting devices, such as transmitting device 750. The transmitting device 750 can transmit acoustic signals (e.g. ultrasonic signals) such as described with regard to transmitting device 104 in FIG. 1. In some implementations, the transmitting device 750 can transmit other suitable signals, such as radio frequency signals. The transmitting device 750 can be implemented using any suitable computing device(s). The transmitting device 750 can include one or more transducers configured to emit acoustic or other suitable signals that can be used by the mobile computing device 710 to facilitate a location estimation of the mobile computing device 710 according to example aspects of the present disclosure. Although only one transmitting device is depicted in FIG. 7, it will be appreciated by those skilled in the art that any suitable number of transmitting devices can be included in the system 700.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for determining a location of a mobile computing device in an acoustic environment associated with an acoustic real-time locating system, the method comprising:
    receiving, by one or more computing devices, acoustic signals from one or more transmitting devices associated with a real-time locating system;
    selecting a set of peaks from the received acoustic signals based at least in part on a magnitude of the peaks and an order in which the peaks were received;
    assigning a first set of transmitter locations to the selected set of peaks using an acoustic model of the environment, wherein the acoustic model specifies the first set of transmitter locations within the acoustic environment;
    generating one or more model path traces based at least in part on the assigning;
    comparing, by the one or more computing devices, the one or more model path traces associated with the first set of transmitter locations to the received acoustic signals;
    estimating, by the one or more computing devices, a location of the mobile computing device based at least in part on the comparison of one or more model path traces to the received acoustic signals; and
    determining, by the one or more computing devices, an orientation of the mobile computing device relative to the transmitter locations specified by the acoustic model.

2. The computer-implemented method of claim 1, wherein receiving the acoustic signals includes receiving the acoustic signals using a microphone, and wherein generating the acoustic model of the acoustic environment includes acknowledging a directional response of the microphone.

3. The computer-implemented method of claim 1, wherein the first set of transmitter locations are associated with at least one virtual transmitting device, and wherein assigning, by the one or more computing devices, a first set of transmitter locations to the selected set of peaks comprises assigning the first set of transmitter locations to the selected set of peaks based at least in part on an angular sensitivity of a transducer associated with the mobile computing device and an orientation of the mobile computing device with respect to the plurality of transmitter locations.

4. The computer-implemented method of claim 1, further comprising:
    assigning, by the one or more computing devices, a second set of transmitter locations to the selected set of peaks; and
    comparing, by the one or more computing devices, a second model path trace associated with the second set of transmitter locations to the received acoustic signals.

5. The computer-implemented method of claim 4, wherein estimating, by the one or more computing devices, a location of the mobile computing device comprises estimating the location of the mobile computing device based at least in part on the comparison of the second model path trace to the received acoustic signals.

6. The computer-implemented method of claim 1, further comprising generating, by the one or more computing devices, a hyperboloid based at least in part on a time difference of arrival between the set of peaks, and the first set of transmitter locations.

7. The computer-implemented method of claim 6, wherein comparing, by the one or more computing devices, a first model path trace associated with the first set of transmitter locations to the received acoustic signals comprises determining at least one of a least squares error sum between the first model path trace and the received acoustic signals, a weighed least squares error sum between the first model path trace and the received acoustic signals, and a correlation between the first model path trace and the received acoustic signals.

8. The computer-implemented method of claim 6, wherein comparing, by the one or more computing devices, a first model path trace associated with the first set of transmitter locations to the received acoustic signals comprises solving an optimization problem associated with the first model path trace and the received acoustic signals.

9. The computer-implemented method of claim 1, further comprising:
comparing, by the one or more computing devices, a second model path trace to the received acoustic signals; and
estimating, by the one or more computing devices, a location of the mobile computing device based at least in part on the comparison of the second model path trace to the received acoustic signals.

10. The computer-implemented method of claim 1, further comprising generating, by the one or more computing devices, the first model path trace based at least in part on the orientation of the mobile computing device relative to the transmitter locations specified by the acoustic model and an acoustic sensitivity of a transducer associated with mobile computing device.

11. The computer-implemented method of claim 1, further comprising estimating, by the one or more computing devices, a velocity of the of the mobile computing device with respect to the one or more transmitter locations based at least in part on IQ signal data, a magnitude, time delay data, and normal direction vectors associated with the received acoustic signals.

12. The computer-implemented method of claim 11, wherein estimating, by the one or more computing devices, a velocity of the of the mobile computing device comprises performing a curve fitting based at least in part on the IQ data, a magnitude, time delay data, and normal direction vectors associated with the received acoustic signals, the curve fitting estimating a randomly initialized phase associated with the received acoustic signals and a velocity vector of the mobile computing device.

13. A computing system comprising:
one or more processors;
one or more memory devices, the one or more memory devices storing computer-readable instructions that when executed by the one or more processors cause the one or more processors to perform operations, the operations comprising:
receiving acoustic signals from one or more transmitting devices associated with a real-time locating system;
selecting a set of at least two of peaks from the received acoustic signals based at least in part on a magnitude of the peaks and an order in which the peaks were received;
assigning a first set of transmitter locations to the selected set of peaks, the first set of transmitter locations specified by an acoustic model specifying a plurality of transmitter locations within an acoustic environment in which the one or more transmitting devices are located;
comparing a first model path trace associated with the first set of transmitter locations to the received acoustic signals;
estimating a location of the mobile computing device based at least in part on the comparison of first model path trace to the received acoustic signals; and
determining an orientation of the mobile computing device relative to the transmitter locations specified by the acoustic model.

14. The computing system of claim 13, wherein the first set of transmitter locations are associated with at least one real transmitting device and at least one virtual transmitting device, and wherein assigning a first set of transmitter locations to the selected set of peaks comprises assigning the first set of transmitter locations to the selected set of peaks based at least in part on an acoustic sensitivity of a transducer associated with the mobile computing device and an orientation of the mobile computing device with respect to the plurality of transmitter locations.

15. The computing system of claim 13, the operations further comprising:
assigning a second set of transmitter locations to the selected set of peaks; and
comparing a second model path trace associated with the second set of transmitter locations to the received acoustic signals.

16. The computing system of claim 13, the operations further comprising generating the first model path trace based at least in part on the orientation of the mobile computing device relative to the transmitter locations specified by the acoustic model and an acoustic sensitivity of a transducer associated with mobile computing device.

17. One or more tangible, non-transitory computer-readable media storing computer-readable instructions that when executed by one or more processors cause the one or more processors to perform operations, the operations comprising:
receiving acoustic signals from one or more transmitting devices associated with a real-time locating system;
selecting a set of at least two of peaks from the received acoustic signals;
assigning a first set of transmitter locations to the selected set of peaks, the first set of transmitter locations specified by an acoustic model specifying a plurality of transmitter locations within an acoustic environment in which the one or more transmitting devices are located;
comparing a first model path trace associated with the first set of transmitter locations to the received acoustic signals;
estimating a location of the mobile computing device based at least in part on the comparison of first model path trace to the received acoustic signals; and determining, by the one or more computing devices, an orientation of the mobile computing device relative to the transmitter locations specified by the acoustic model.

* * * * *